(12) United States Patent
Williams (10) Patent No.: US 7,437,143 B1
(45) Date of Patent: Oct. 14, 2008

(54) METHOD AND SYSTEM FOR SETTING UP EMERGENCY SERVICES CALLS TO AN EMERGENCY SERVICES NETWORK

(75) Inventor: Stephen Douglas Williams, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 467 days.

(21) Appl. No.: 11/064,368

(22) Filed: Feb. 23, 2005

(51) Int. Cl.
*H04M 11/04* (2006.01)
*H04Q 7/20* (2006.01)

(52) U.S. Cl. .................................. 455/404.1; 455/426

(58) Field of Classification Search .............. 455/404.1, 455/521, 404.2, 455, 426
See application file for complete search history.

(56) References Cited

U.S. PATENT DOCUMENTS

| | | | | |
|---|---|---|---|---|
| 6,078,804 | A * | 6/2000 | Alperovich et al. | 455/404.1 |
| 6,405,033 | B1 * | 6/2002 | Kennedy et al. | 455/414.1 |
| 6,922,565 | B2 * | 7/2005 | Rhodes et al. | 455/456.1 |
| 7,130,641 | B1 * | 10/2006 | Al-Khashti et al. | 455/456.1 |
| 7,209,457 | B1 * | 4/2007 | Leuca et al. | 370/328 |
| 2005/0009499 | A1 * | 1/2005 | Koster | 455/406 |
| 2005/0063519 | A1 * | 3/2005 | James | 379/45 |

OTHER PUBLICATIONS

Regional District of Fraser-Fort George, *Regional 9-1-1 Dispatch Centre, Service Feasibility Report, Section 9.0 Final Projections*, pp. 1-21, see especially Section 9.3.2, dated Jun. 10, 2002.

Paula Gordon, *Selected List of Y2K References and Resources*, http://users.rcn.com/pgordon/y2k/a.html, pp. 1-28, see especially "Telecommunications" p. 18, dated Sep. 22, 1999, downloaded from the World Wide Web on Dec. 6, 2004.

CML Emergency Services, Inc., *Sentinel CommandPOST*, downloaded from the World Wide Web at http://www.cmltech.com/products/commandpost.asp on Dec. 6, 2004.

CML Emergency Services, Inc., CML Emergency Services, 9-1-1 Communications—Radio Dispatch, pp. 1-2, http://www.cmltech.com/product/commandpost.asp, published on the World Wide Web on Jun. 27, 2004.

Zetron, Inc., *Mobile PSAP Hits the Ground Running*, Jan. 2003, downloaded from http://www.zetron.com/pages/english/realw/7325.html on Dec. 6, 2004.

* cited by examiner

*Primary Examiner*—Nick Corsaro
*Assistant Examiner*—Shannon R Brooks (57) ABSTRACT

A method and system for setting up an emergency services call (ESC) to an emergency services network (ESN), where the method involves receiving a request to set up an ESC between a calling device and an ESN, determining whether the calling device is a fixed device or a mobile device, setting up the ESC to a wireless telephone number of the ESN if the calling device is a fixed device, and setting up the ESC to a wireless telephone number of the ESN if the calling device is a mobile device. In the case of the calling device being a fixed device, an ESC conversation is sent to the wireless telephone number of the ESN via a wireless air interface, and location determination information for determining the location of the calling device is sent to a landline signaling interface of the ESN using out-of-band signaling.

20 Claims, 4 Drawing Sheets

METHOD AND SYSTEM FOR SETTING UP EMERGENCY SERVICES CALLS TO AN EMERGENCY SERVICES NETWORK

BACKGROUND

1. Field of Invention

The present invention relates to telecommunications and, more particularly, to setting up emergency services calls between communication devices and emergency services networks.

2. Description of Related Art

Emergency services calls may be placed for many reasons, such as to request police assistance, to request fire-fighting assistance, or to request emergency medical service. Emergency services calls may be placed by dialing an emergency telephone number. Many countries have established a unique emergency telephone number that may be dialed within their country to place an emergency services call.

In many cases, the emergency telephone number has fewer digits than telephone numbers used to place non-emergency calls. Advantageously, the use of fewer digits allows the emergency telephone number to be dialed more quickly and reduces the burden of having to remember a telephone number having more digits. As examples, the emergency telephone number in Japan is 119, and the emergency telephone number in the United Kingdom is 999. As another example, the emergency telephone number in the United States is 911. In most parts of the United States, both landline telephones and wireless communication devices (WCDs), such as cell phones, may place emergency services calls by dialing the digits 911.

Further, a telephone system that facilitates placing an emergency services call to an emergency telephone number may provide a location of the caller to an agent station that handles the caller's emergency services call. That way, an agent handling the caller's emergency services call can dispatch emergency service providers to the caller's location.

Under current industry standards, when a mobile switching center (MSC) receives a 911 call from a cellular WCD, the MSC will send an IS-41 ORREQ message via a signaling system No. 7 (SS7) network to a mobile positioning center (MPC) to facilitate determination of the calling WCD's location. The MPC will then respond to the MSC with an emergency services routing key (ESRK), which is a key that (i) uniquely identifies an emergency services call in a given cell site/sector, and (ii) correlates data that is provided to an emergency services network (ESN) by different paths, such as a voice path and an automatic location identification (ALI) data path. The MSC will then set up the call over a designated trunk group to a local ESN and provide the ESN with the ESRK. In particular, the MSC will engage in ISUP call setup signaling via the SS7 network with an ESN switch or router, to set up the call and provide the ESRK. The ESN will then use the ESRK to determine the calling WCD's location, typically by querying the MPC over an IP network connection. Further, an automatic call distributor (ACD) of the ESN will set up the call to an available agent station for handling of the emergency services call and will provide the agent with the determined location, to assist the agent in responding to the call.

SUMMARY

The present invention advances over the existing art by providing a mechanism for selectively routing an emergency services call (ESC) based on a determination whether a device that has placed the ESC is a fixed device or a mobile device. In particular, the mechanism sets up the ESC to a wireless telephone number of an emergency services network (ESN) if the device that places the ESC is a fixed device, and the mechanism sets up ESC to a landline telephone number of the ESN if the device that places the ESC is a mobile device.

In one respect, an exemplary embodiment of the invention may thus take the form of a method to set up an emergency services call (ESC). The method involves (i) receiving a request to set up the ESC between a device that originates the request and an emergency services network (ESN) that services a location where the device is located, (ii) determining whether the device is a mobile device or a fixed device, (iii) setting up the ESC to a wireless telephone number at the ESN if the device is a fixed device, and (iv) setting up the ESC to a landline telephone number at the ESN if the device is a mobile device.

In another respect, the exemplary embodiment may take the form of a method for setting up an ESC between a calling device and an ESN, where the ESN includes a wireless telephone interface having (i) an assigned wireless telephone number, (ii) a signaling interface, and (iii) an agent station. The method involves (i) setting up the ESC from the device to the wireless telephone interface, and in turn to the agent station, (ii) receiving, at the signaling interface, a signal that includes an identifier of the wireless telephone interface, and a location correlator for use in determining a location of the device, (iii) querying a location-determination platform to determine the location of the device based on the received location correlator, and (iv) receiving the location of the device in a response from the location-determination platform, and passing the location to the agent station.

In yet another respect, the exemplary embodiment may take the form of an ESN for receiving an ESC placed from a calling device. According to the exemplary embodiment, the ESN includes (i) a wireless telephone interface that is served by a wireless switching center, (ii) a processor, (iii) a signaling interface for receiving call setup information, and (iv) one or more agent stations. The wireless telephone interface has an assigned wireless telephone number and receives the ESC placed from the device to the wireless telephone number. The signaling interface receives the call setup information and provides the call setup information to the processor. The processor (i) sets up the ESC to one of the agent stations, and (ii) queries a location-determination platform to determine the location of the device based on the call setup information, and thereafter passes the location of the device to the one of the agent stations.

Advantageously, the exemplary embodiment can allow an ESN to distinguish between calls from fixed WCDs and calls from mobile WCDs, so as to handle calls from fixed WCDs more like calls from landline calling devices while handing calls from mobile WCDs in the manner such calls are traditionally handled.

As presently contemplated, upon receiving a call from a fixed WCD, the ESN can determine the location of the fixed WCD simply by searching an automatic location identifier (ALI) database that includes the location of the fixed WCD. Whereas, upon receiving a call from a mobile WCD, the ESN must determine the location of the mobile WCD using another method, such as requesting an MPC to determine and to provide the location of the mobile WCD to the ESN. Typically, the location of a device may be determined more quickly by searching an ALI database than by requesting an MPC to determine and provide the location.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF DRAWINGS

An exemplary embodiment of the invention is described herein with reference to the drawings, in which.

DETAILED DESCRIPTION

1. Overview

According to the exemplary embodiment, emergency services calls placed from fixed calling devices will be set up to a wireless telephone number of an emergency services network (ESN), while emergency services calls placed from mobile calling devices will be set up to a landline telephone number of the ESN. A calling device initiates an ESC by sending to a wireless switching center a request to set up the ESC. The wireless switching center then determines whether the calling device is a fixed device or a mobile device, and the switching center sets up the ESC to the wireless telephone number of the ESN if the calling device is fixed, or to the landline telephone number of the ESN if the calling device is mobile.

Figure 1:
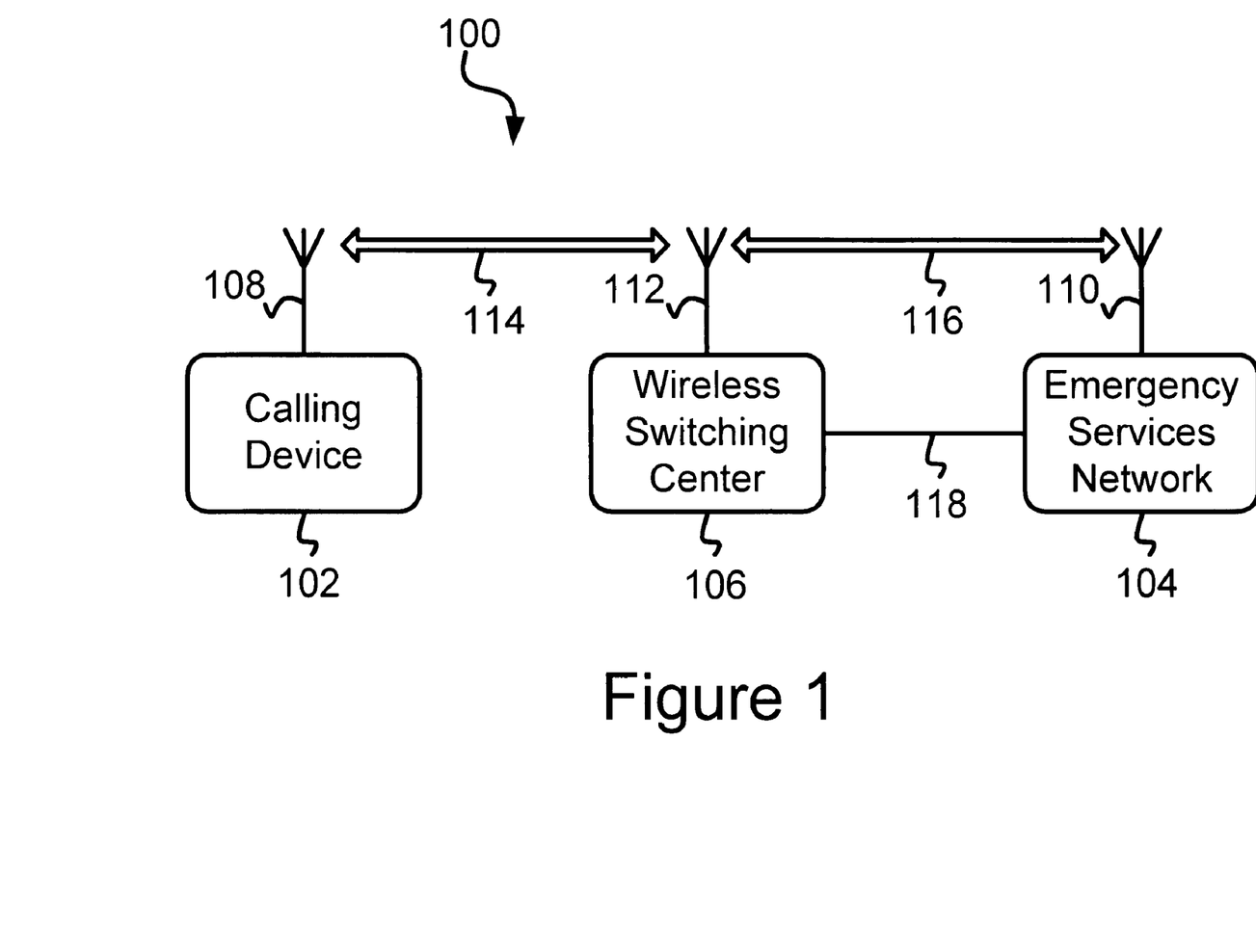
FIG. 1 is a simplified block diagram illustrating a system in which the exemplary embodiment can be implemented.

The exemplary embodiment may be carried out in a system as shown in FIG. 1. As illustrated, the system 100 includes a calling device 102, an ESN 104, and a wireless switching center 106. A first antenna 108 is coupled to the calling device 102. A second antenna 110 is coupled to the ESN 104. And a third antenna 112 is coupled to the wireless switching center 106.

The calling device 102 is preferably a wireless communication device (WCD). A WCD may be characterized as a mobile WCD or a fixed WCD. An example of a mobile WCD is a hand-held cellular phone. Another example of a mobile WCD is a mobile cellular telephone integrated into an automobile. An example of a fixed WCD is a wireless local loop (WLL) hub that allows landline telephone equipment to make and receive telephone calls via a wireless access network even though the landline telephone equipment is not connected to a local loop telephone line. Details of a WLL hub are identified in U.S. patent application Ser. No. 10/784,659, entitled Method and System for Alerting a User when the Registered Location of a Fixed Wireless Device is Incorrect and filed on Feb. 23, 2004, which is hereby incorporated by reference.

The ESN 104 is a network for setting up emergency services calls. The ESN 104 may include a public safety answering point (PSAP), which is the terminating end-point of an ESC. The PSAP may include agent stations so that agents working at the PSAP can answer emergency services calls that are routed to the PSAP. The agents may respond to the needs of a caller by dispatching emergency medical services personnel, police officers, and/or fire fighters, as requested by the caller.

The wireless switching center 106 is a switch that allows for communicating data between the calling device 102 and the ESN 104. An exemplary arrangement of the wireless switching center 106 is described below.

The calling device 102 and the ESN 104 may communicate various types of data by way of the wireless switching center 106. For example, the calling device 102 may send to the wireless switching center 106 data that includes a first call setup request, and in turn, the wireless switching center 106 may send to the ESN 104 data that includes a second call setup request. In this regard, the second call setup request may be the same as the first call setup request and/or may be based on the first call setup request. As another example, the calling device 102 and the ESN 104 may communicate data that includes voice communication data that represents words spoken by a party at the calling device 102 or words spoken by an agent working at the ESN 104. Other examples of the data the calling device 102 and the ESN 104 may communicate with each other are also possible.

The third antenna 112 allows the wireless switching center 106 to engage in wireless communications with the calling device 102 and the ESN 104. Engaging in the wireless communications with the calling device 102 involves the wireless switching center 106 (i) transmitting data to the calling device 102 via a first air interface 114, and/or (ii) receiving data transmitted from the calling device 102 via the first air interface 114. Engaging in the wireless communications with the ESN 104 involves the wireless switching center 106 (i) transmitting data to the ESN 104 via a second air interface 116, and/or (ii) receiving data transmitted from the ESN 104 via the second air interface 116.

The first air interface 114 and the second air interface 116 may be arranged according to an agreed protocol. The wireless switching center 106 communicates with the calling device 102 and the ESN 104 according to the agreed protocol. Example air interface protocols include (i) the code division multiple access (CDMA) air interface protocol, (ii) the time division multiple access (TDMA) air interface protocol, and (iii) the global system for mobile communications (GSM) air interface protocol. Other examples of an air interface protocol are also possible.

The wireless switching center 106 and the ESN 104 are both coupled to a wired trunk group 118. The wired trunk group 118 provides an alternative path for communicating data between the wireless switching center 106 and the ESN 104, instead of communicating data between the wireless switching center 106 and the ESN 104 over second air interface 116. A wired trunk group may be arranged in various configurations. For example a wired trunk group may comprise one or more digital signal zero (DS0) links. A DS0 link may be arranged to carry a single voice connection and may operate at a given bit rate, such as 56,000 bits per second (bps) or 64,000 bps. Other examples of a wired trunk group configuration are also possible.

According to the exemplary embodiment, a user of the calling device 102 initiates an ESC by dialing an emergency telephone number, such as 911. The calling device 102 communicates first data to the wireless switching center 106, via the first air interface 114. The first data may comprise call setup information, such as the emergency telephone number. After the wireless switching center 106 receives the first data, the wireless switching center 106 executes logic for determining whether the calling device 102 is a mobile device or a fixed device. If the wireless switching center 106 determines the calling device 102 is a fixed device, the wireless switching center 106 communicates second data to the ESN 104, via the second air interface, so as to set up an ESC to a given wireless telephone number of the ESN 104. The second data may comprise call setup information, such as the given wireless telephone number. If the wireless switching center 106 determines the device 102 is a mobile device, the wireless switching center 106 communicates third data to the ESN 104, via the wired trunk group 118, so as to set up an ESC to a given landline telephone of the ESN 104. The third data may comprise call setup information, such as a landline telephone number of the ESN 104.

2. Exemplary Architecture

Figure 2:
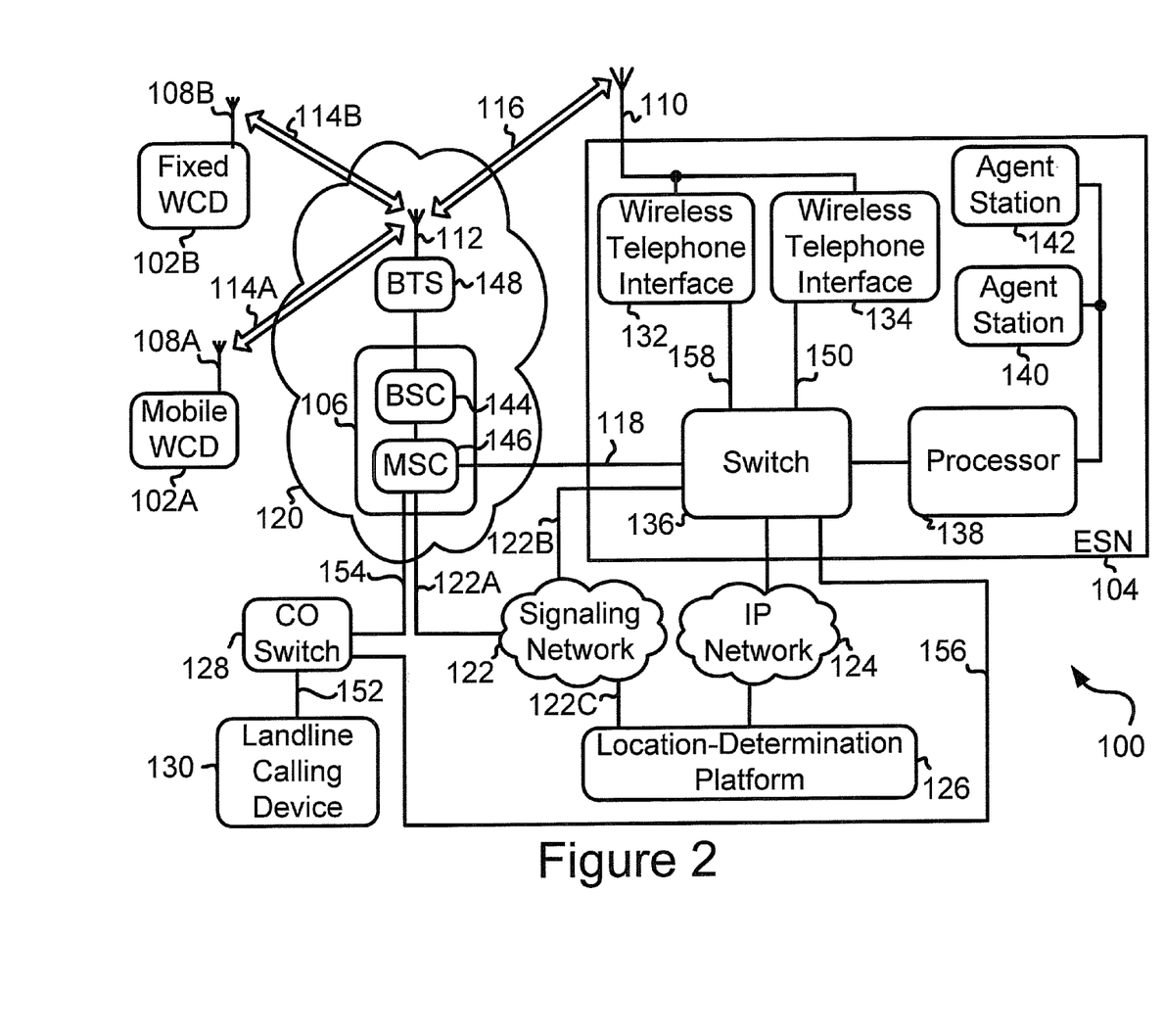
FIG. 2 is another simplified block diagram illustrating a system in which the exemplary embodiment can be implemented.

FIG. 2 illustrates additional details of the system 100. As shown in FIG. 2, the system 100 includes two embodiments of the calling device 102. In this regard, a first embodiment of the calling device 102 is a mobile WCD 102A, and a second embodiment of the calling device 102 is a fixed WCD 102B. The system 100 also includes (i) the ESN 104, (ii) a wireless access network 120, (iii) a signaling network 122, (iv) an internet protocol (EP) network 124, (v) a location-determination platform (LDP) 126, (vi) a central office (CO) switch 128, and (vii) a landline calling device 130. Further, in particular, the ESN 104 comprises (i) a first wireless telephone interface 132, (ii) a second wireless telephone interface 134, (iii) a switch 136, (iv) a processor 138, (v) a first agent station 140, (vi) a second agent station 142, and (vii) the second antenna 110.

The wireless access network 120 comprises the wireless switching center 106. In particular, the wireless switching center 106 includes a base station controller (BSC) 144 and a mobile switching center (MSC) 146, which are arranged and coupled with each other in a manner well known to those of ordinary skill in the cellular telephony field. The wireless switching center 106 may be coupled to one or more base transceiver stations, such as the base transceiver station (BTS) 148. The BTS 148 comprises a tower with one or more antennas for transmitting and/or receiving data via (i) the second air interface 116, (ii) a third air interface 114A, and (iii) a fourth air interface 114B. The one or more antennas of the BTS 148 may include the third antenna 112.

The mobile WCD 102A comprises an antenna 108A. The antenna 108A transmits data, via the third air interface 114A, to the second antenna 112, for transmission in turn to the wireless switching center 106. The antenna 108A receives data that the second antenna 112 transmits over the third air interface 114A. The third air interface 114A may comprise a first traffic channel of the first air interface 114. The data that the second antenna 112 transmits comprises data that the wireless switching center 106 sends to the second antenna 112.

The fixed WCD 102B comprises an antenna 108B. The antenna 108B transmits data, via a fourth air interface 114B, to the second antenna 112, for transmission in turn to the wireless switching center 106. The antenna 108B receives data that the second antenna 112 transmits over the fourth air interface 114B. The fourth air interface 114B may comprise a second traffic channel of the first air interface 114.

The mobile WCD 102A and the fixed WCD 102B may each respectively place various types of calls. For example, the mobile WCD 102A and the fixed WCD 102B may each place non-emergency services calls, such as a call between the mobile WCD 102A and the fixed WCD 102B. As another example, the mobile WCD 102A and the fixed WCD 102B may each place a respective emergency services call to the ESN 104. Other examples of the types of calls the mobile WCD 102A and the fixed WCD 102B can place are also possible.

The BSC 144 communicates with wireless calling devices over a respective air interface, such as the third air interface 114A or the fourth air interface 114B. The BSC 144 communicates with wireless calling devices using an agreed air interface protocol, such as one of the air interface protocols listed above.

The MSC 146 functions as a switch to provide connectivity with other switches, such as the switch 136 and the CO switch 128. Further, the MSC 146 may be coupled to the signaling network 122 via a first signaling link 122A. Although the BSC 144 and the MSC 146 are shown as separate entities, the two entities could instead be co-located and integrated together.

The signaling network 122 comprises a network for performing out-of-band signaling. Out-of-band signaling is signaling that does not take place over the same path that carries the voice communication of an ESC. Out-of-band signaling may take place prior to, during, and/or after the voice communications of an ESC. An example of a path for performing out-of-band signaling may include (i) the first signaling link 122A that is coupled to the MSC 146, and (ii) a second signaling link 122B that is coupled to the switch 136. As another example, a path for performing out-of-band signaling may include a third signaling link 122C that is coupled to the LDP 126.

The signaling network 122 may be arranged according to any of a variety of signaling network architectures. For example, the signaling network 122 may be arranged according to the Integrated Services digital network User Part (ISUP) Signaling System No. 7 (SS7) architecture. As another example, the signaling network 122 may be arranged according to the Session Initiation Protocol for Telephone (SIP-T) architecture. Other examples of a signaling network architecture are also possible.

The IP network 124 provides means for communicating over a packet-switched network according to a transmission control protocol (TCP) and an internet protocol. The TCP manages the assembling of messages into small packets for transmission over the IP network 124 and for reassembling the small packets into the original message. The IP manages the address part of each packet so that each packet gets to the correct destination. In this regard, both the switch 136 and the LDP 126 may each function as a respective destination for receiving packets. Further, both the switch 136 and the LDP 126 may each function as a device that sends packets to a destination over the EP network 124. The IP network 124 may comprise the Internet or may be part of the Internet.

The LDP 126 determines a location of a calling device. Various arrangements of the LDP 126 are possible. For example, the LDP 126 may comprise a mobile positioning center (MPC) that functions to determine the location of a mobile calling device. As another example, the LDP 126 may comprise (i) means for receiving a request to determine a location of a calling device, (ii) means for determining the location of the calling device, and (iii) means for providing the location in response to receiving the request to determine the location of the calling device.

A request to determine the location of a calling device may comprise a location correlator. A location correlator may correlate a given ESC with data associated with the ESC. In this regard, the data associated with the ESC may comprise call setup information and/or caller identification data, such as a telephone number of the calling device or automatic number identification (ANI) data. As an example, the location correlator may be arranged as an emergency services routing key (ESRK).

In order to determine a registered location for a given calling device, the LDP 126 may comprise a device and/or logic for performing automatic location identification (ALI). ALI may involve processing ANI data for the given calling device. The ANI data for the given calling device may be sent to the wireless switching center 106 and/or to the ESN 104, as call setup information. After receiving the ANI data, the wireless switching center 106 and/or the ESN 104 may send the ANI data and a request to determine a location of the calling device, to the LDP 126. The LDP 126 may search profile data to determine a location associated with the received ANI data and then send the location to the device (e.g., the wireless switching center 106 or the ESN 104) that sent the ANI data and the request.

The LDP 126 may comprise and/or have access to a database having profile data associated with a plurality of calling devices. In this regard, the profile data may be located in a service control point (SCP). The profile data may include various types of data. For example, the profile data may comprise data that indicates a location of a calling device. As another example, the profile data may comprise data that indicates whether a calling device is a fixed device or a mobile device.

The ESN 104 includes two wireless telephone interfaces, the first wireless telephone interface 132 and the second wireless telephone interface 134. Alternatively, the ESN 104 could include a number of wireless telephone interfaces that is greater than or less than two wireless telephone interfaces. Each wireless telephone interface within the ESN 104 may be assigned a respective wireless telephone number and may set up a respective ESC with a respective calling device. For example, the first wireless telephone interface 132 may be assigned a first wireless telephone number and may set up a first ESC with the mobile WCD 102A, and the second wireless telephone interface 134 may be assigned a second wireless telephone number and may set up a second ESC with the fixed WCD 102B.

The first wireless telephone interface 132 and the second wireless telephone interface 134 may be coupled to a common antenna. The common antenna may comprise the second wireless antenna 110. The common antenna allows the first wireless telephone interface 132 and the second wireless telephone interface 134 to interface with the second wireless air interface 116. In this regard, the first wireless telephone interface 132 may receive a first ESC over a first traffic channel of the second wireless air interface 116, and the second wireless telephone interface 134 may receive a second ESC over a second traffic channel of the second wireless air interface 116.

Alternatively, the first wireless telephone interface 132 and the second wireless telephone interface 134 may each be coupled to separate antennas. In this regard, the first wireless telephone interface 132 may interface to the first traffic channel of the second wireless air interface 116 via a first separate antenna, and the second wireless telephone interface 134 may interface to the second traffic channel of the second wireless air interface 116 via a second separate antenna.

Various means are available for coupling the first wireless telephone interface 132 and the second wireless telephone interface 134 to the switch 136. For example, the first wireless telephone interface 132 may be coupled to the switch 136 via a first DS0 link 158, and the second wireless telephone interface 134 may be coupled to the switch 136 via a second DS0 link 150. The first wireless telephone interface 132 may include a first DS0 connection for coupling to the first DS0 link 158, and the second wireless telephone interface 134 may include a second DS0 connection for coupling to the second DS0 link 150. Other examples of means for coupling the first wireless telephone interface 132 and the second wireless telephone interface 134 to the switch 136 are also possible.

Various arrangements for the switch 136 are possible. For example, the switch 136 may comprise a signal switching point (SSP). An SSP is a telephone switch that includes (i) logic for processing SS7 signaling, and (ii) a signaling interface. A signaling interface (i) terminates one or more signaling links, (ii) receives call setup information, and (iii) provides the call setup information to a processor. The switch 136 may include a third DS0 connection for coupling to the first DS0 link 158 and a fourth DS0 connection for coupling to the second DS0 link 150.

The processor 138 may comprise one or more processors, such as a general purpose processor and/or a digital signal processor. The processor 138 provides means for executing program logic to perform various functions. For example, the processor 138 may execute a first set of program logic that facilitates forwarding an ESC setup request to a given wireless telephone interface, from the given wireless telephone interface to a given agent station. Execution of the first set of program logic may involve selecting the given agent station from among a plurality of agent stations. The selection may be based various factors, such as whether an agent is present at the given agent station, and/or the amount of time since each agent station of the plurality of agent stations last ended a respective ESC. The first set of program logic may be arranged such that the processor 138 functions as an automatic call distributor (ACD) for automatically forwarding emergency services calls to agent stations.

As another example, the processor 138 may execute a second set of program logic that facilitates querying the LDP 126 to determine the location of a given calling device. The second set of program logic may be arranged such that the processor 138 instructs the switch 136 to request the LDP 126 to determine the location of the given calling device. In this regard, the request may be based on call-setup information received from the calling device.

As yet another example, the processor 138 may execute a third set of program logic that facilitates passing a location of the given calling device to the given agent station. Execution of the third set of program logic may occur in response to receiving the location of the given calling device from the LDP 126. Other examples of program logic executable by the processor 138 are also possible.

The program logic executable at the processor 138 may be stored within data storage. Preferably, the data storage is non-volatile data storage such as EEPROM, although the data storage could be volatile data storage such as RAM. The data storage may located internal to the processor 138 and/or external to the processor 138. Further, the data storage may store other forms of data as well. For example, the data storage may store setup information, location correlators, and location information of a calling device. Other examples of data stored in the data storage are also possible.

The ESN 104 includes two agent stations, the first agent station 140 and the second agent station 142. Alternatively, the ESN 104 could include a number of agent stations greater than or less than two agent stations. The first agent station 140 provides means for a first agent to answer a first ESC forwarded to the first agent station 140 and to provide emergency services for the caller who placed the first ESC. The second agent station 142 provides means for a second agent to answer a second ESC forwarded to the second agent station 142 and to provide emergency services for the caller who placed the second ESC. The first agent and the second agent may provide emergency services in various ways. For example, the first and second agents may provide emergency services by dispatching fire fighters, police officers, or emergency medical service providers to a location where emergency services are required. As another example, the first and second agents may provide emergency services by providing a respective caller with information, such as directions to a hospital or to a police station.

Various arrangements for an agent station are possible. For example, an agent station may include a telephone so that an agent can carry out a voice conversation with the caller that placed the ESC. As another example, an agent station may include a personal computer and monitor in combination for displaying data associated with an ESC. The data associated with the ESC may include (i) a call-back number of the calling device, and (ii) the location of the calling device. Other examples of an arrangement for an agent station are also possible.

In addition to the wireless switching center 106 receiving requests from the mobile WCD 102A and/or the fixed WCD 102B to set up an ESC at the ESN 104, the wireless switching center 106 may receive requests from the landline calling device 130 to set up an ESC at the ESN 104. The landline calling device 130 may be located at a given fixed location, such as a house or office. In this regard, the landline calling device may be characterized as a fixed calling device. An example of the landline calling device 130 is a conventional landline telephone.

The landline calling device 130 may be coupled to the CO switch 128 via a local loop telephone line 152. The CO switch 128 is a switch that can couple the local loop telephone line 152 to the MSC 146 of the wireless switching center 106 via a second wired trunk group 154. The CO switch 128 can also couple the local loop telephone line 152 to the switch 136 via a third wired trunk group 156.

The CO switch 128 may receive, from the landline calling device 128, a request to set up an ESC. The CO switch 128 may comprise a fourth set of program logic for determining where the CO switch 128 should route the request to set up an ESC. Typically, the CO switch 128 would route a request to the switch 136 via the third wired trunk group 156. However, the CO switch 128 may execute the fourth set of program logic and determine that the request should be routed to the MSC 146 via the second wired trunk group 154. This may occur, for example, when all circuits of the third wired trunk group 156 are unavailable for routing the request. Other examples of when the request from the landline calling device 130 should be routed to the MSC 146 are also possible.

After the MSC 146 receives a request to set up an ESC from the landline calling device 130, the MSC 146 may execute program logic to determine whether the landline calling device 130 is a fixed device or a mobile device. If the landline calling device is characterized as a fixed calling device, then the ESC is routed to a wireless telephone number of the ESN 104. Whereas, if the landline calling device is characterized as a mobile calling device, then the ESC is routed to a landline calling device of the ESN.

Further, it should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

3. Exemplary Operation

Figure 3:
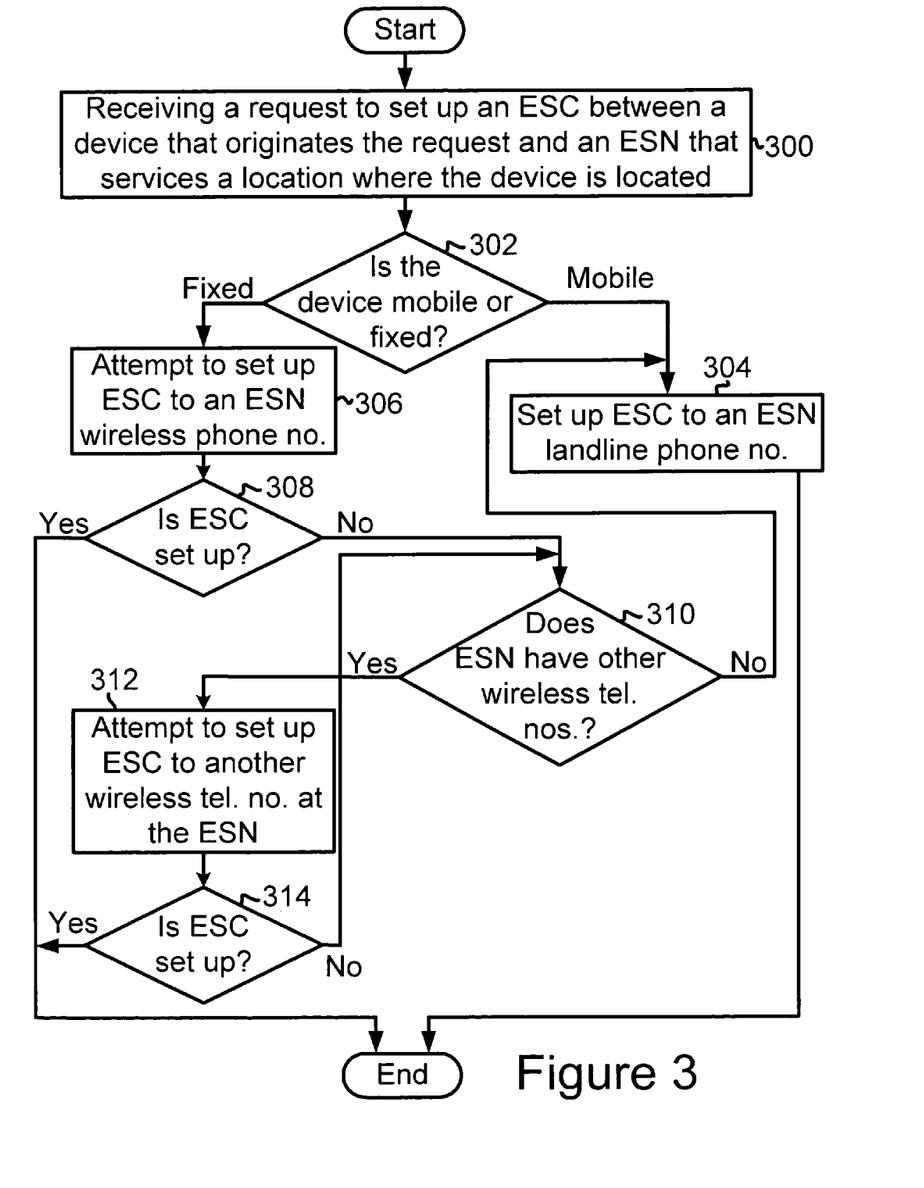
FIG. 3 is a flow chart depicting functions that can be carried out in accordance with the exemplary embodiment.

FIG. 3 is a flow chart that depicts a method that is arranged in accordance with the exemplary embodiment. The elements of FIG. 2 will be used to explain this method. As shown in FIG. 3, at block 300, the method involves receiving a request to set up an ESC between a device that originates the request and an ESN that services a location where the device is located.

As an example, the fixed WCD 102B may send a request to set up the ESC, and the wireless switching center 106 may receive the request. In particular, the fixed WCD 102B may send the request over the fourth air interface 114B and the wireless switching center 106 may receive the request at an antenna coupled to the wireless switching center 106.

As another example, the landline calling device 130 may send a request to set up the ESC, and the wireless switching center 106 may receive the request. In particular, the landline calling device 130 may send the request to the wireless switching center 106 via the local loop telephone line 154 and the second wired trunk group 156.

Next, at block 302, a first determination is made. The first determination indicates whether the device that sent the request to set up the ESC is a mobile device or a fixed device. Making the first determination may be carried out in various ways. For example, making the first determination may be carried out via a wireless intelligent network interaction between the MSC 146 and the LDP 126 after the wireless switching center 106 receives the request to set up the ESC. If the device that sent the request to set up the ESC is a WCD, the wireless intelligent network interaction may involve (i) the MSC 146 querying the LDP 126 to characterize the WCD, and (ii) the LDP 126 referring to profile data to determine whether the WCD is characterized as a fixed WCD or a mobile WCD. If the WCD is characterized as a fixed WCD, then the LDP 126 can responsively tell the MSC 146 to set up the ESC to a wireless phone number of the ESN 104. Whereas, if the WCD is characterized as a mobile WCD, then the LDP 126 can responsively tell the MSC 146 to set up the ESC to a landline telephone number of the ESN 104.

As another example, making the first determination may be carried out by the MSC 146 executing program logic stored at the MSC 146. Executing the program logic stored at the MSC 146 may allow for determining that the request to set up the ESC was sent to the MSC 146 over the second wired trunk group 154 instead of over a wireless air interface. In this regard, determining that the request to set up the ESC was sent over the second wired trunk group indicates that the landline calling device 130 sent the request. Typically, the landline calling device is a fixed device, and thus receiving the request from the second wired trunk group typically indicates the request is from a fixed device.

Further, execution of program logic stored at the MSC 146 may result in the MSC 146 sending a query to the LDP 126 to confirm that the device that sent the request to set up the ESC is a fixed calling device. Sending the query may involve sending automatic number identification (ANI) data to the LDP 126. The LDP 126 may refer to profile data associated with the received ANI data to confirm that the device that sent the request to set up the ESC is a fixed calling device, and then send confirmation to the MSC 146 that the device is a fixed device.

If the first determination indicates that the calling device is a mobile device, next, at block 304, the ESC is set up to a landline telephone number of the ESN. For example, setting up the ESC to the landline telephone number may involve (i) the MSC 146 sending a call request to the switch 136 via the first wired trunk group 118, (ii) the switch 136 requesting the processor 138 to set up the ESC, and (iii) the processor 138 forwarding the ESC to an agent station. The ESN may have more than one landline telephone number. In this regard, if an attempt to set up the ESC to a first landline telephone number is unsuccessful, then attempts to set up the ESC may be made to the other landline telephone numbers until the ESC is successfully set up to one of the landline telephone numbers.

If, on the other hand, the first determination indicates the calling device is a fixed device, next, block 306 involves attempting to set up the ESC to a first wireless telephone number of the ESN. As an example, attempting to set up the ESC to the first wireless telephone number may involve the wireless switching center 106 transmitting a page to a first wireless telephone interface that is assigned the first wireless telephone number. After receiving the page, the first wireless telephone interface may responsively send a page response message to the wireless switching center 106. If the page response message indicates the first wireless telephone interface can set up the ESC, then the BSC 144 may assign an air interface traffic channel for use by the first wireless telephone interface, and then connect the ESC to the first wireless telephone interface over that air interface traffic channel.

If the page response message indicates the first wireless telephone interface cannot set up the ESC, the wireless switching center 106 may terminate the attempt to set up the ESC to the first wireless telephone interface. Alternatively, the wireless switching center 106 may periodically send a page to the first wireless telephone interface until the first wireless telephone interface sends a page response message that indicates the first wireless telephone interface can set up the ESC. Thereafter the BSC may assign a traffic channel and connect the ESC over the assigned traffic channel.

Next, at block 308, a second determination is made. The second determination indicates whether or not the ESC is set up to the first wireless telephone number. If the second determination indicates the ESC is set up at the first wireless telephone number, then setting up the ESC is complete and other functions for keeping the ESC connected and/or for ending the ESC may be performed, as necessary.

If the second determination indicates the ESC is not set up to the first wireless telephone number, then at block 310, a third determination is made. The third determination indicates whether the ESN has other wireless telephone numbers to which the ESC may be set up. Making the third determination may involve checking whether an attempt to set up the ESC was made to each wireless telephone number of the ESN. If the third determination indicates that the ESN has no other wireless telephone numbers to which an attempt to set up the ESC may be made, then the ESC is set up to the landline telephone number of the ESN (block 304).

Various reasons may exist for the ESN having no other wireless telephone numbers to which to set up the ESC. For example, the ESN may have no other wireless telephone numbers to which an ESC may be set up because the ESN has only one wireless telephone interface and only one wireless telephone number assigned to the wireless telephone interface, and the one wireless telephone number is handing another ESC. As another example, the ESN may have no other wireless telephone numbers to which an ESC may be set up because all wireless telephone numbers at the ESN are each handling a respective ESC. Other reasons for why the ESN has no other wireless telephone numbers to which to set up an ESC are also possible.

If on the other hand, the third determination indicates that the ESN has other wireless telephone numbers to which the ESC may be set up, then at block 312, the method involves attempting to set up the ESC to another wireless telephone number at the ESN. Attempting to set up the ESC to another wireless telephone number may involve the wireless switching center 106 transmitting a page to another wireless telephone interface that is assigned the other wireless telephone number. After receiving the page, the other wireless telephone interface may responsively send a page response message to the wireless switching center 106. If the page response message indicates the other wireless telephone interface can set up the ESC, then the BSC 144 of a wireless switching center 106 may assign an air interface traffic channel for use by the other wireless telephone interface, and then connect the ESC to the other wireless telephone interface over that air interface traffic channel.

Next, block 314 involves making a fourth determination. The fourth determination indicates whether the ESC is successfully set up to another wireless telephone number of the ESN. The fourth determination indicates whether or not the ESC is set up to the other wireless telephone number. If the fourth determination indicates the ESC is set up to the other wireless telephone number, then setting up the ESC is complete, and other functions for keeping the ESC connected and/or for ending the ESC may be performed, as necessary. If the fourth determination indicates the ESC is not set up to the other wireless telephone number, then the method involves making the third determination again at block 310 and then continuing with the method based on the results of the third determination, until the ESC is successfully set up.

Figure 4:
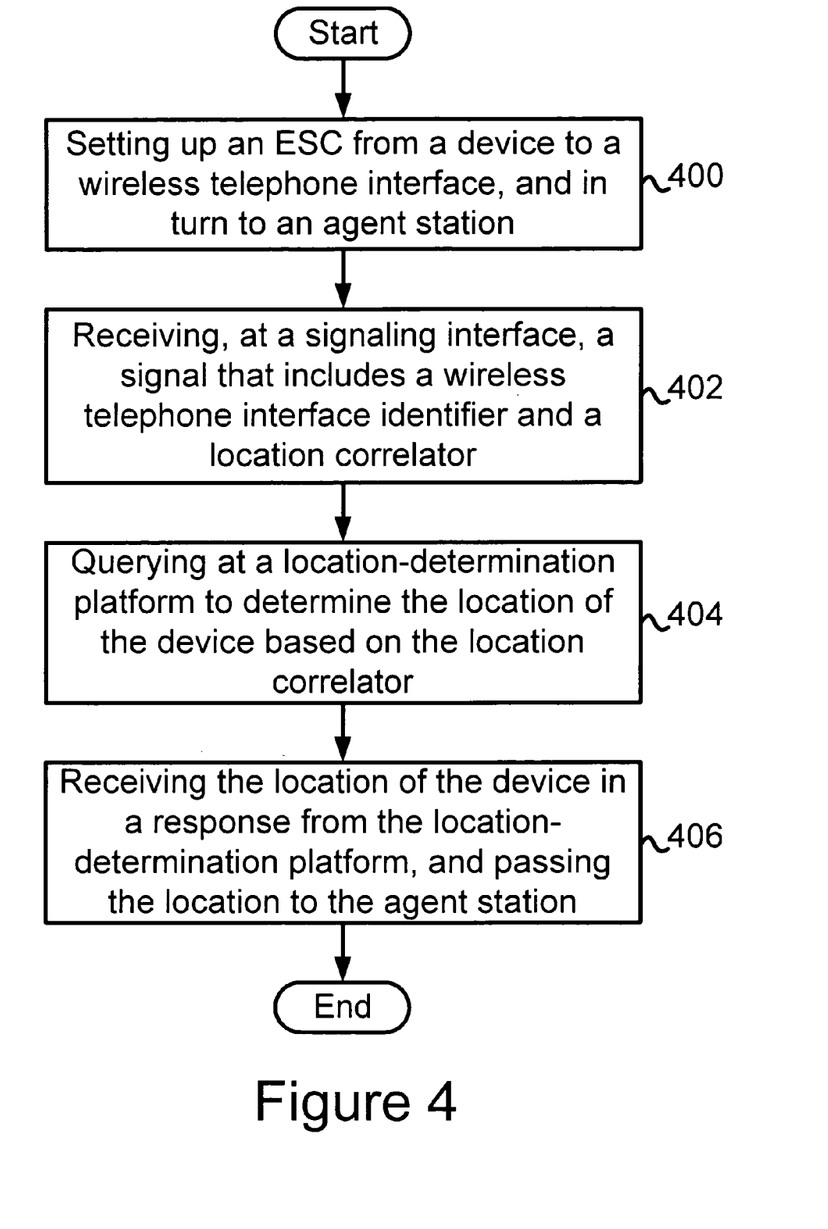
FIG. 4 is another flow chart depicting functions that can be carried out in accordance with the exemplary embodiment.

FIG. 4 is a flow chart that depicts another method arranged in accordance with the exemplary embodiment. The elements of FIG. 2 will be used to explain this method. As shown in FIG. 4, at block 400, the method involves setting up an ESC from a calling device to a wireless telephone interface, and in turn to an agent station. Setting up the ESC to the wireless telephone interface may involve (i) paging the ESN over an air-interface paging channel, (ii) directing a BSC to assign an air interface traffic channel for use by the wireless telephone interface, and (iii) connecting the ESC to the ESN over the assigned air interface traffic channel. The wireless telephone interface may have an assigned wireless telephone number, and thus, paging the ESN may comprise paging the wireless telephone interface having the assigned wireless telephone number.

Setting up the ESC to the agent station may be carried out according to any of a variety of methods. For example, setting up the ESC to the agent station may involve (i) sending, from the wireless telephone interface to the agent station, a first signal for notifying an agent that an ESC has been set up at the wireless telephone interface, (ii) the agent station sending, to the wireless telephone interface, a second signal that indicates the agent will handle the ESC, and (iii) the wireless telephone interface connecting the ESC to the agent station.

As another example, setting up the ESC to the agent station may involve routing the ESC to one of a plurality of agent stations via an automatic call distribution (ACD) device. The ACD may select the one of the plurality of agent stations based on logic executed by the processor 138. The logic may be arranged so that the processor 138 makes the selection based various factors, such as which of the plurality of agent stations have an agent available to handle an ESC, and/or the amount of time since each of the plurality of agent stations has last ended an ESC. Other examples of the various factors for arranging logic to select one of a plurality of agent stations are also possible.

Next, block 402 involves receiving, at a signaling interface, a signal that includes a wireless telephone interface identifier and a location correlator. Receiving the signal at the signaling interface may involve the signaling interface receiving an out-of-band signal sent over a DS0 channel of a signaling network. In this regard, the signaling interface may include a DS0 port that is coupled to the DS0 channel. The out-of-band signal may be arranged as a session initiation protocol for telephone (SIP-T) signal or as a Signaling System No. 7 (SS7) signal. In particular, an SS7 signal may comprise a message signaling unit (MSU) that includes the wireless telephone interface identifier and the location correlator.

A wireless telephone interface identifier identifies the wireless telephone interface of the ESN that has received the ESC. As an example, a wireless telephone interface identifier may comprise a wireless telephone number assigned to a wireless telephone interface. As another example, a wireless telephone interface identifier may comprise a SIP uniform resource locator (URL). Other examples of a wireless telephone interface identifier are also possible.

A location correlator comprises data that may be used to determine the location of a calling device and that identifies an ESC placed by the calling device. Various arrangements of location correlators are possible. For example, the location correlator may be arranged as an ESRK. As another example, the location correlator may be arranged as ANI data. Other examples of arrangements for location correlators are also possible.

Next, block 404 involves querying a location-determination platform (LDP) to determine the location of the calling device based on the received location correlator. Querying an LDP, such as LDP 126, may be carried out using any of a variety of methods. For example, a method for querying the LDP may involve sending a first query message from a signaling interface of the switch 136 to the LDP 126 over the third signaling link 122C. The first query message may comprise the location correlator and a request to determine the location associated with the location correlator.

As another example, a method for querying the LDP may involve sending a second query message to the LDP 126 over the IP network 124. The second query message may comprise a hypertext markup language (html) message that includes the location correlator and a request to determine the location associated with the location correlator. Other examples of a method for querying the LDP to determine the location of the calling device based on the location correlator are also possible.

In response to receiving, at the LDP 126, a location correlator in a query message (e.g., the first query message or the second query message), the LDP 126 may (i) search a database that correlates location information with a plurality of location correlators so as to determine the location associated with the received location correlator, and (ii) send a query response message that indicates the location of the device associated with the received location correlator. Other examples of how the LDP 126 responds to receiving a query message are also possible.

Next, block 406 involves receiving the location of the device in a response from the LDP, and then passing the location to the agent station. A variety of methods are available for receiving the location of the device in a response from the LDP. For example, a method for receiving the location of the device may involve receiving, at the switch 136, a query response message sent over the third signaling link 122C. As another example, a method for receiving the location of the device may involve receiving, at the switch 136, a query response message sent over the IP network 124. Other examples of a method for receiving the location of the device in a response from the LDP are also possible.

Further, various methods are available for passing a received location to the agent station. For example, a method for passing a received location to the agent station may involve (i) the processor 138 executing logic to identify an agent station that is handling the ESC and to request the switch 136 to send the received location to the identified agent station, and (ii) the switch 136 sending the received location to the identified agent station in response to receiving the request to send the received location to the agent station.

As another example, a method for passing the received location to the agent station may involve (i) the switch 136 sending the received location to the processor 138, and (ii) the processor 138 sending the received location to the agent station that is handling the ESC. Other examples of a method for passing the received location to the agent station are also possible.

After receiving the location at the agent station, an agent may then provide emergency services to the caller, such as dispatching police officers, firefighters, or emergency medical service providers to the location as needed.

4. Conclusion

An exemplary embodiment of the present invention have been described above. Those skilled in the art will understand, however, that changes and modifications may be made to the embodiment described without departing from the true scope and spirit of the present invention, which is defined by the claims.

I claim:

1. A method for setting up an emergency services call (ESC), the method comprising:
   receiving a request to set up an ESC, wherein the received request comprises a request to set up an ESC between a wireless communication device that originates the request and an emergency services network (ESN) that services a location where the wireless communication device is located;
   making a determination of whether the wireless communication device is a mobile wireless communication device or a fixed wireless communication device;
   if the determination is that the wireless communication device is a fixed wireless communication device, then setting up the ESC to a wireless telephone number at the ESN; and
   if the determination is that the wireless communication device is a mobile wireless communication device, then setting up the ESC to a landline telephone number at the ESN.

2. The method of claim 1, wherein the ESN has a plurality of wireless telephone numbers, wherein setting up the ESC to the wireless telephone number involves (i) setting up the ESC to a given one of the plurality of wireless telephone numbers, and (ii) if setting up the ESC to the given one of the plurality of wireless telephone numbers is not successful, then setting up the ESC to another one of the plurality of wireless telephone numbers.

3. The method of claim 2, wherein setting up the ESC to the wireless telephone numbers involves sequentially attempting to set up the ESC to wireless telephone numbers of the plurality of wireless telephone numbers until a successful connection is established.

4. The method of claim 1, further comprising:
   receiving a location correlator that correlates the ESC to the location of the device; and
   communicating the location correlator to the ESN for use in determining the location of the device.

5. The method of claim 4, wherein communicating the location correlator to the ESN involves transmitting the location correlator to the ESN as caller-identification information for the ESC.

6. The method of claim 5, wherein the location correlator is selected from the group consisting of (i) an emergency services routing key, and (ii) automatic number identification data.

7. The method of claim 4, wherein communicating the location correlator to the ESN involves:
associating the location correlator with the wireless telephone number at the ESN; and
transmitting the location correlator and the wireless telephone number to the ESN using out-of-band signaling.

8. The method of claim 7, wherein the location correlator is selected from the group consisting of (i) an emergency services routing key, and (ii) automatic number identification data.

9. The method of claim 7, wherein the wherein the out-of-band signaling comprises signaling selected from the group consisting of (i) Signaling System No. 7 (SS7) signaling, and (ii) Session Initiation Protocol for Telephones (SIP-T) signaling.

10. The method of claim 1, wherein setting up the ESC to the wireless telephone number involves:
paging the ESN over an air-interface paging channel;
directing a base station controller to assign an air interface traffic channel for use by the ESN; and
connecting the ESC to the ESN over the assigned air interface traffic channel.

11. The method of claim 1, wherein determining whether the device is a mobile device or a fixed device comprises (i) requesting a remote apparatus to determine whether the device is mobile or fixed, and (ii) responsively receiving, from the remote apparatus, a response indicating whether the device is mobile or fixed.

12. An emergency services network (ESN) that routes an emergency services call (ESC), placed by a wireless communication device, to a given agent station of the ESN, the ESN comprising:
a wireless telephone interface that is assigned a wireless telephone number, wherein the wireless telephone interface is operable to receive an ESC from a wireless network switch via an air interface;
an ESN switch that is assigned a landline telephone number, wherein the ESN switch connects to the wireless network switch via a first wired connection and to the wireless telephone interface via a second wired connection, and wherein the ESN switch is operable to receive an ESC from the wireless network switch via the first wired connection;
one or more agent stations; and
a call distribution processor,
wherein the wireless network switch receives a particular ESC placed by a wireless communication device and determines whether the wireless communication device that placed the particular ESC is a fixed wireless communication device or a mobile wireless communication device,
wherein if the wireless network switch determines that the wireless communication device is a fixed wireless communication device, then the ESN receives the particular ESC at the wireless telephone interface,
wherein if the wireless network switch determines that the wireless communication device that placed the particular ESC is a mobile wireless communication device, then the ESN receives the particular ESC at the ESN switch via the wired connection to the wireless network switch, and
wherein the call distribution processor routes the particular ESC from the wireless telephone interface or the ESN switch to a given agent station of the one or more agent stations.

13. The emergency services network of claim 12, further comprising:
one or more other wireless telephone interfaces each assigned a respective wireless telephone number, wherein each of the one or more other wireless telephone interfaces is available for setting up a respective emergency services call with a respective wireless communication device.

14. The emergency services network of claim 13, wherein the wireless telephone interface and the one or more other wireless telephone interfaces are coupled to a common antenna.

15. The emergency services network of claim 12, further comprising:
a signaling interface operable to receive call setup information associated with the particular ESC and to provide the received call setup information to the call distribution processor,
wherein the call distribution processor (i) queries a location-determination platform to determine, based on the received call setup information, a location of the wireless communication device that placed the particular ESC, (ii) receives from the location-determination platform a message that indicates the location of the wireless communication device, and (iii) thereafter passes the location of the device to the given agent station.

16. The emergency services network of claim 15, wherein the call setup information is received, at the signaling interface, in the form of a signal selected from the group consisting of (i) a signaling system no. 7 (SS7) signal, and (ii) a session initiation protocol for telephones (SIP-T) signal.

17. The emergency services network of claim 15, wherein the call setup information comprises an emergency services routing key.

18. The emergency services network of claim 12, wherein the ESN switch connects to the wireless telephone interface via a digital signal zero (DSO) link.

19. The emergency services network of claim 12,
wherein the ESN switch interfaces to an Internet protocol (IP) network,
wherein the ESN switch (i) sends to a location-determination platform via the IP network a request to determine a location of the wireless communication device that placed the ESC, and (ii) receives from the location-determination platform a message that indicates the location of the wireless communication device, and
wherein the location of the device is passed to the given agent station.

20. The emergency services network of claim 12, wherein the wireless network switch comprises a mobile switching center and a base station controller.

* * * * *